(12) United States Patent
Anderson et al.

(10) Patent No.: US 9,168,864 B2
(45) Date of Patent: Oct. 27, 2015

(54) REDUCED PROFILE LAMP HAVING ENHANCED ILLUMINATION AND METHOD OF CONSTRUCTION THEREOF

(75) Inventors: James B. Anderson, Cookeville, TN (US); Stephen A. Bynum, Cookeville, TN (US)

(73) Assignee: Federal-Mogul Ignition Company, Southfield, MI (US)

( * ) Notice: Subject to any disclaimer, the term of this patent is extended or adjusted under 35 U.S.C. 154(b) by 232 days.

(21) Appl. No.: 13/091,198

(22) Filed: Apr. 21, 2011

(65) Prior Publication Data

US 2012/0014124 A1    Jan. 19, 2012

Related U.S. Application Data

(60) Provisional application No. 61/326,467, filed on Apr. 21, 2010.

(51) Int. Cl.
| | |
|---|---|
| *B60Q 1/00* | (2006.01) |
| *H05K 3/30* | (2006.01) |
| *B60Q 3/02* | (2006.01) |
| *B60Q 3/00* | (2006.01) |
| *F21S 8/10* | (2006.01) |
| *F21V 8/00* | (2006.01) |

(52) U.S. Cl.
CPC .............. *B60Q 3/0279* (2013.01); *B60Q 3/004* (2013.01); *F21S 48/215* (2013.01); *F21S 48/2243* (2013.01); *F21S 48/2268* (2013.01); *F21S 48/2281* (2013.01); *G02B 6/0036* (2013.01); *G02B 6/0058* (2013.01); *Y10T 29/4913* (2015.01)

(58) Field of Classification Search
CPC .... B60Q 3/002–3/005; B60Q 3/0279–3/0296; B60Q 3/004; G02B 6/0036
USPC ........................................ 362/490, 493, 509
See application file for complete search history.

(56) References Cited

U.S. PATENT DOCUMENTS

| | | | |
|---|---|---|---|
| 6,454,452 B1 * | 9/2002 | Sasagawa et al. ............. | 362/561 |
| 6,533,445 B1 | 3/2003 | Rogers | |
| 6,890,089 B2 * | 5/2005 | Haering et al. ............... | 362/490 |
| 7,244,058 B2 * | 7/2007 | DiPenti et al. ............... | 362/547 |
| 7,287,886 B2 * | 10/2007 | Iwai .............................. | 362/490 |
| 7,311,433 B2 * | 12/2007 | Chen et al. .................... | 362/617 |

(Continued)

FOREIGN PATENT DOCUMENTS

| | | |
|---|---|---|
| DE | 10108073 | 8/2002 |
| JP | H04123210 | 11/1992 |

(Continued)

*Primary Examiner* — Elmito Breval
(74) *Attorney, Agent, or Firm* — Robert L. Stearns; Dickinson Wright, PLLC

(57) ABSTRACT

A lighting assembly for a vehicle, and in particular, an interior lighting assembly having a reduced profile using solid state illuminators is provided along with a method of construction thereof. The assembly includes a housing; a lens attached to the housing; a printed circuit board disposed between the housing and the lens; at least one light source attached in operable electrical communication to the printed circuit board; and a light blade. The light blade has opposite sides disposed between the printed circuit board and the lens. One of the sides has a first configuration of optics and the other of the sides has a second configuration of optics, wherein the first and second configurations of optics are different from one another.

11 Claims, 3 Drawing Sheets

(56) References Cited

U.S. PATENT DOCUMENTS

| | | | |
|---|---|---|---|
| 7,404,659 B2 * | 7/2008 | Mai | 362/606 |
| 7,434,949 B2 * | 10/2008 | Imai | 362/26 |
| 7,434,973 B2 * | 10/2008 | Parker et al. | 362/606 |
| 7,438,452 B2 * | 10/2008 | Nawashiro | 362/490 |
| 7,566,154 B2 | 7/2009 | Gloisten et al. | |
| 7,699,512 B2 * | 4/2010 | Mueller et al. | 362/511 |
| 7,703,967 B2 | 4/2010 | Parker | |
| 7,712,932 B2 | 5/2010 | Parker et al. | |
| 7,773,043 B1 | 8/2010 | Horner et al. | |
| 8,028,537 B2 * | 10/2011 | Hanley et al. | 62/298 |
| 8,147,104 B2 * | 4/2012 | Umeda et al. | 362/488 |
| 8,506,141 B2 * | 8/2013 | Cannon et al. | 362/490 |
| 8,545,084 B2 * | 10/2013 | Kim et al. | 362/615 |
| 2002/0044436 A1 * | 4/2002 | Ohkawa | 362/31 |
| 2002/0054488 A1 | 5/2002 | Ohkawa | |
| 2003/0048641 A1 * | 3/2003 | Alexanderson et al. | 362/470 |
| 2005/0013139 A1 * | 1/2005 | Sugihara et al. | 362/490 |
| 2005/0219853 A1 | 10/2005 | Iwai | |
| 2006/0133113 A1 | 6/2006 | Koike et al. | |
| 2006/0256581 A1 | 11/2006 | Hwang et al. | |
| 2006/0279959 A1 * | 12/2006 | Yabashi et al. | 362/490 |
| 2007/0189040 A1 * | 8/2007 | Chi et al. | 362/620 |
| 2008/0259623 A1 * | 10/2008 | Spazier | 362/490 |
| 2009/0073708 A1 * | 3/2009 | Kino et al. | 362/490 |
| 2009/0251912 A1 * | 10/2009 | Kino et al. | 362/492 |
| 2009/0268484 A1 | 10/2009 | Kim et al. | |
| 2010/0165661 A1 * | 7/2010 | Kino et al. | 362/612 |

FOREIGN PATENT DOCUMENTS

| | | |
|---|---|---|
| JP | H04124201 U | 11/1992 |
| JP | 2004227956 | 8/2004 |
| JP | 2009087887 | 4/2009 |

* cited by examiner

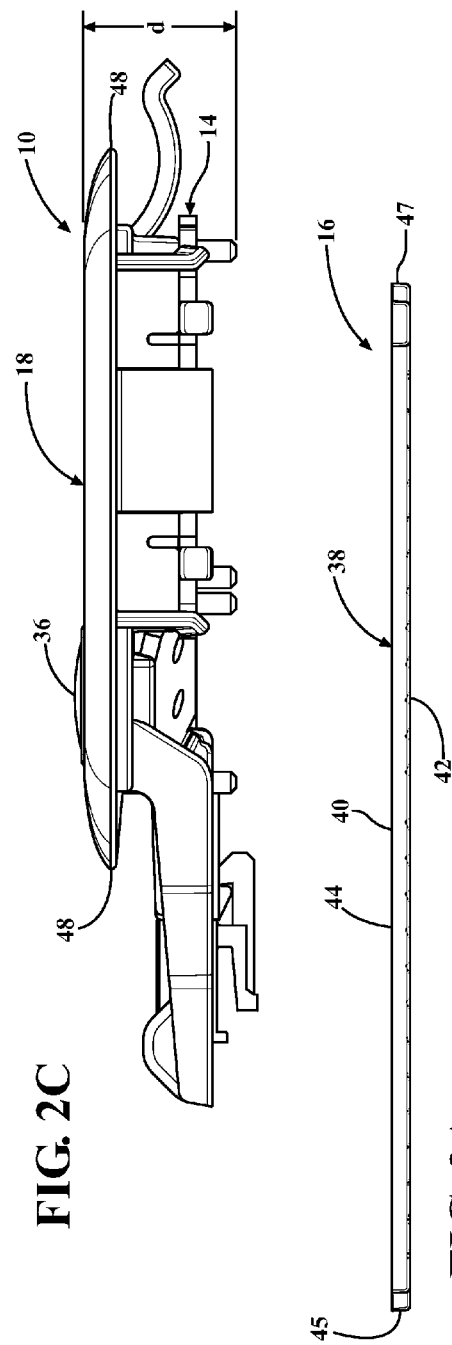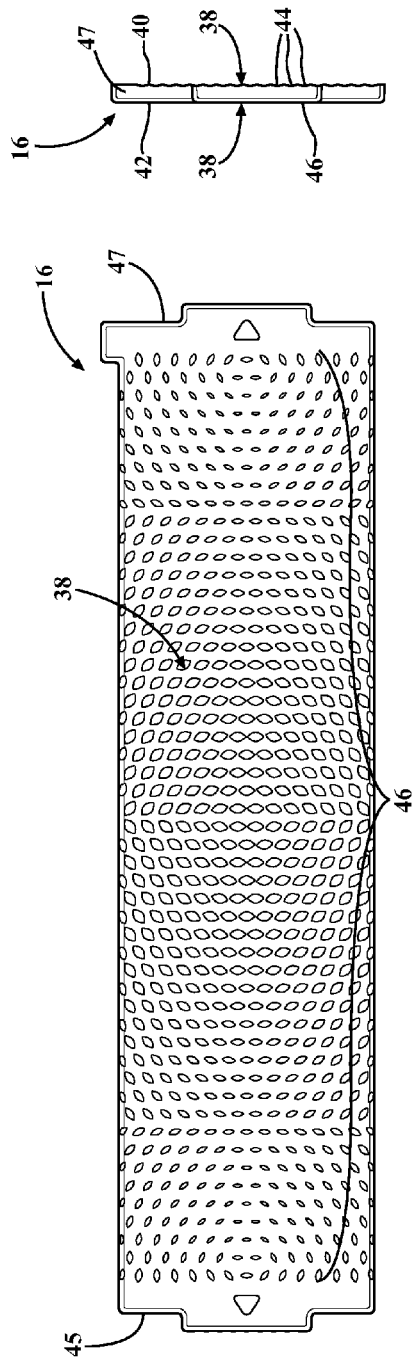

REDUCED PROFILE LAMP HAVING ENHANCED ILLUMINATION AND METHOD OF CONSTRUCTION THEREOF

CROSS-REFERENCE TO RELATED APPLICATION

This application claims the benefit of U.S. Provisional Application Ser. No. 61/326,467, filed Apr. 21, 2010, which is incorporated herein by reference in its entirety.

BACKGROUND OF THE INVENTION

1. Technical Field

This invention relates generally to a lighting assembly for a vehicle, and in particular, to an interior lighting assembly for a vehicle with a reduced profile using solid state illuminators.

2. Related Art

Lighting technology has advanced over the last several years in the direction of replacing traditional incandescent lamps, which generally occupy a relative large envelope of space and require an even greater amount of space to dissipate heat and focus light emitted therefrom, with light sources including light emitting diodes (LEDs), organic light emitting diodes (OLEDs) or electro luminescence devices (EL), particularly in scenarios where energy consumption, heat and space are an issue. Accordingly, conventional LED, OLED and EL illumination devices exist on the market today, wherein the devices typically utilize a single light source. For example, dome lights using LED technology are installed in aircraft, buses, automobiles and various other commercial vehicles. However, these dome lights often do not provide enough light to illuminate the desired space and/or object, are energy inefficient and typically consume valuable space, often requiring an packing depth of 15-22 mm or greater.

SUMMARY OF THE INVENTION

A lighting assembly for a vehicle, and in particular, an interior lighting assembly having a reduced profile using solid state illuminators is provided. The assembly includes a housing; a lens attached to the housing; a printed circuit board disposed between the housing and the lens; at least one light source attached in operable electrical communication to the printed circuit board; and a light blade. The light blade has opposite sides disposed between the printed circuit board and the lens. One of the sides has a first configuration of optics and the other of the sides has a second configuration of optics. The first and second configurations of optics being different from one another.

In accordance with another aspect of the invention, one or more light sources, such as LEDs, OLEDs and EL devices, are provided on each end of the printed circuit board.

In accordance with yet another aspect of the invention, the exterior lens scatters light emitted from the blade via the light sources.

In accordance with yet another aspect of the invention, a method of constructing a lighting assembly for a vehicle is provided. The method includes providing a housing; attaching a lens to the housing; providing a printed circuit board; attaching at least one light source in operable electrical communication with the printed circuit board; forming a light blade having opposite sides and providing one of the sides with a first configuration of optics and providing the other of the sides with a second configuration of optics different from the first configuration of optics; and disposing the light blade between the lens and the printed circuit board and operably attaching the housing to the printed circuit board.

In accordance with another aspect of a method of constructing a light assembly for a vehicle, the method further includes forming the light assembly having a thickness extending between an outer surface of the lens and a bottom surface of the assembly being no greater than 8 mm.

In accordance with another aspect of a method of constructing a light assembly for a vehicle, the method further includes forming one of the first or second configuration of optics having a uniform pattern and forming the other of the first or second configuration of optics having a non-uniform pattern.

In accordance with another aspect of a method of constructing a light assembly for a vehicle, the method further includes forming one of the first or second configuration of optics having a first density in a central portion of the light blade and a second density adjacent opposite ends of the light blade with the first density being greater than the second density.

BRIEF DESCRIPTION OF THE DRAWINGS

These and other aspects, features and advantages of the invention will become more readily appreciated when considered in connection with the following detailed description of presently preferred embodiments and best mode, appended claims and accompanying drawings, in which:

FIG. 2C shows an assembled side profile view of the lighting assembly of FIG. 1;

FIG. 3A shows a front view of a light blade constructed in accordance with one aspect of the invention;

FIG. 3B shows a rear view of the light blade of FIG. 3A; and

FIG. 3C shows a side view of the light blade of FIG. 3A.

DETAILED DESCRIPTION OF PRESENTLY PREFERRED EMBODIMENTS

Figure 1:
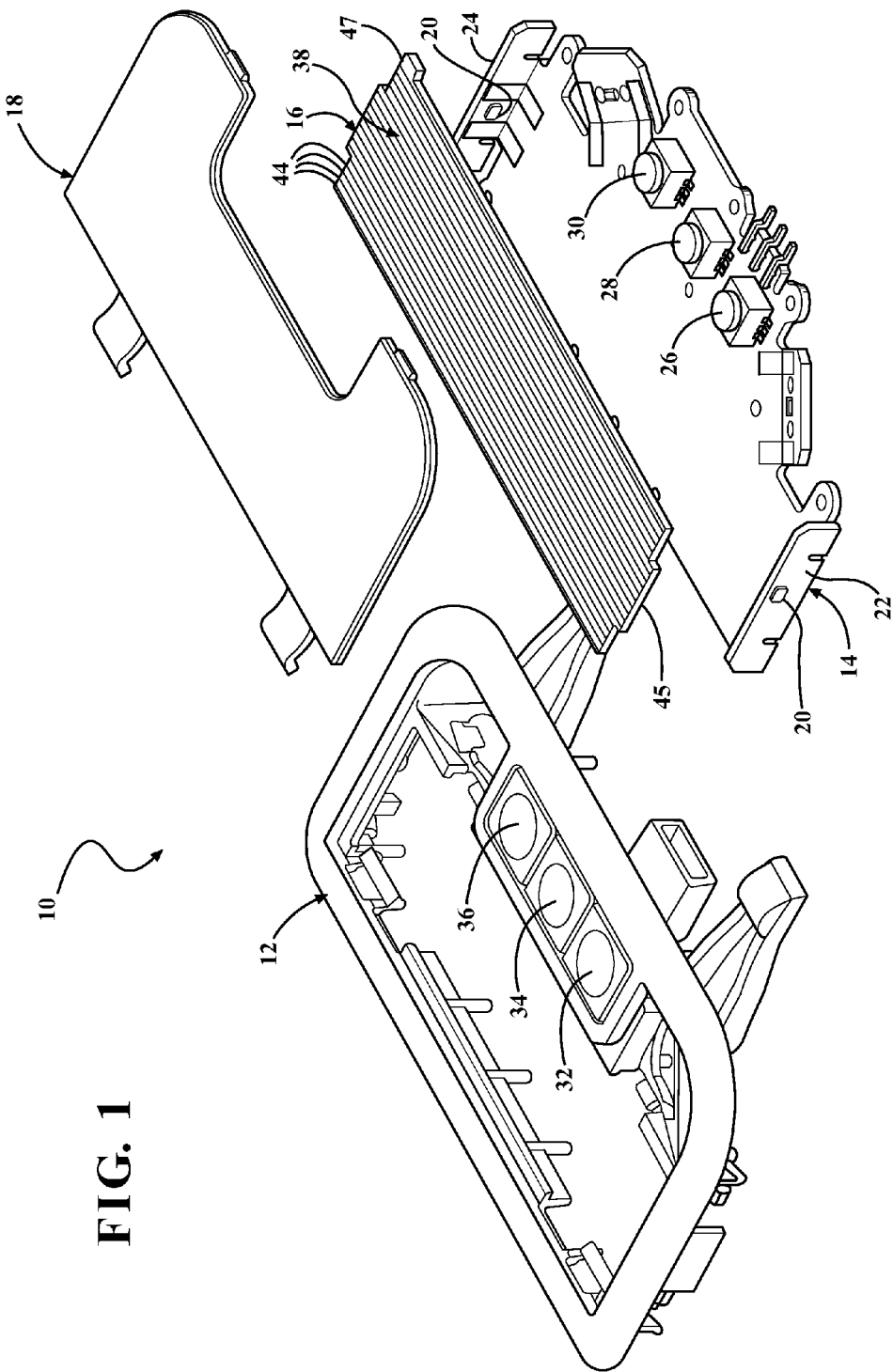
FIG. 1 shows an exploded view of an exemplary lighting assembly in accordance with one embodiment of the invention.
Figure 2A:
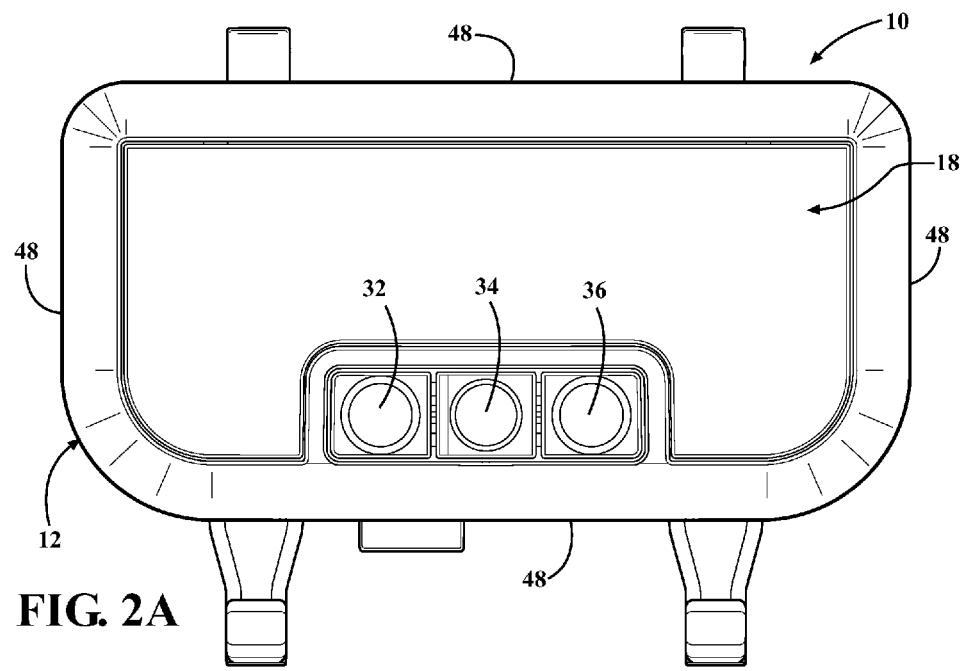
FIG. 2A shows an assembled top view of the lighting assembly of FIG. 1.
Figure 2B:
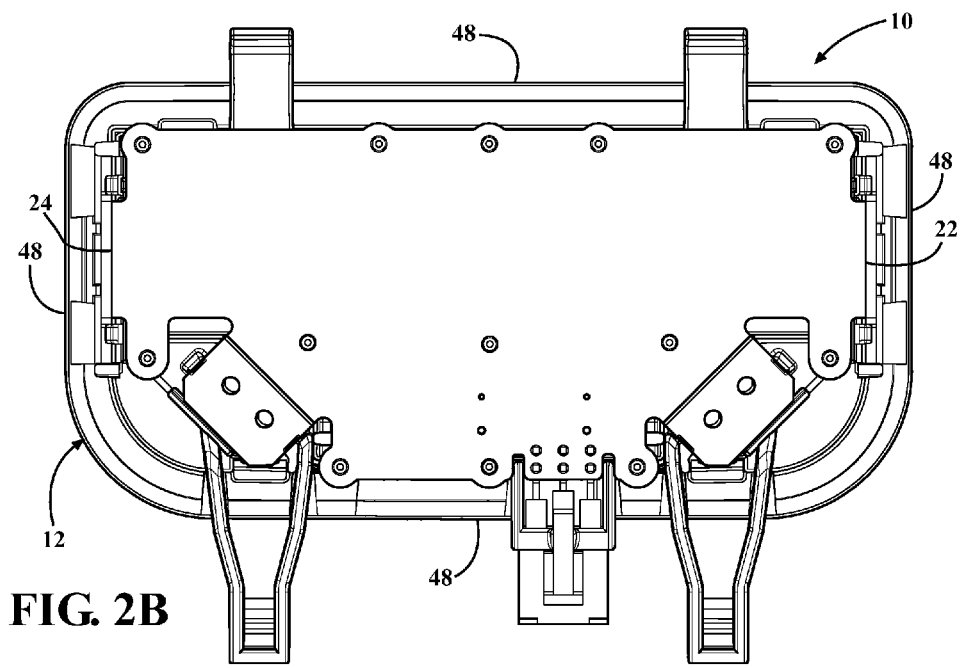
FIG. 2B shows an assembled bottom view of the lighting assembly of FIG. 1.

Referring in more detail to the drawings, FIG. 1 illustrates a lighting assembly, referred to hereafter as assembly 10, constructed in accordance with one aspect of the invention for a vehicle, and in particular, an interior lighting assembly for a vehicle. The assembly 10 includes one or a plurality of solid state illuminators, for example, LEDs, OLEDs and EL driven devices and is suitable for use as, by way of example and without limitation, a dome light or a map light, and the solid state illuminators may have a variety of functional attributes, such as flashing, color, dimming, etc. The use of such LEDs, OLEDs and EL driven devices, which are compact in shape and radiate reduced heat for a light source, allow the overall interior light assembly to be designed such that it has a significantly reduced side profile, as shown in FIG. 2C, thereby requiring a minimal envelope of space. For example, the assembly 10 provides total packaging depth (d) of about 8 mm or smaller, wherein the package depth is the total thickness of the assembly 10. Further, the ability to include a plurality of the light sources within the assembly 10 allows light emitted therefrom to have an increased brightness over an expansive area to ensure the desired area and/or item is illuminated by the assembly 10.

The assembly 10 includes, for example, a housing 12, a printed circuited board (PCB) 14, a light blade 16 and an exterior lens 18. The PCB 14 has one or more light sources 20, such as a solid state illuminator, located at each opposite end 22, 24 thereof. However, it should be recognized that the light sources 20 could be placed at other locations on the PCB 14 in lieu of or in addition to the ends 22, 24. The solid state illuminators may include LEDs, OLEDs, ELs or any other illuminator that provides a compact shape with reduced heat compared to traditional incandescent bulbs. In the illustrated embodiment, at least one, and shown as a plurality of three internal buttons 26, 28, 30 are configured on the PCB 14 to enable operation of the assembly 10 in association with a corresponding number of exterior buttons 32, 34, 36 in the housing 12. When the desired external button or buttons 32, 34, 36 are actuated, the corresponding internal button or buttons 26, 28, 30 on the PCB are actuated, thereby activating or deactivating the corresponding light source 20.

The light blade 16 is operably connected to one or both of the PCB 14 and housing 12, and the lens 18 is fastened to the housing 12 with the light blade 16 disposed between the PCB 14 and the lens 18. When the light source or sources 20 are energized, they illuminate through the light blade 16 and the exterior lens 18, such that the light sources 20 provide improved illumination compared to known light sources and assemblies therewith. Notably, to enhance the illumination of the light sources 20, the light blade 16 has optics in the form of an optical pattern formed thereon. The optics can be formed in a transparent substrate 38 bonded to opposite sides, also referred to as first and second sides 40, 42, of the light blade 16, or directly on the opposite sides 40, 42 of the light blade 16, as desired. It is understood that the light blade 16 and exterior lens 18 can be made from any light translucent or transparent material readily applied in the art, and the lens 18 is made of a material suitable for scattering the emitted light.

As mentioned above, and as best depicted in FIGS. 3A and 3C, the light blade 16 has optics on each side 40, 42 thereof, which facilitates constructing the assembly 10 having its minimal total thickness d extending between an outer surface of the lens 10 and a bottom surface of the PCB 14. Specifically, as best shown in FIGS. 1 and 3C, the first side 40 of the light blade 16 has optical elongate concave flute features 44 (only some flutes identified by reference numerals for simplicity) that extend parallel or substantially parallel to one another between opposite ends 45, 47 of the light blade 16. The flute features 44 are shown as providing a uniform pattern, whereas the second side 42 of the light blade 16 has a plurality of discrete optical dimple or pillow features 46 configured in a non-uniform pattern, such that the density of the pillow features 46 varies from one area to another, shown as having an increased density toward the center of the light blade 16 and a decreased density adjacent the opposite ends 45, 47. Significantly, providing different optics on each side 40, 42 of the light blade 16, as described and illustrated, provides increased and more focused illumination compared to a light blade having a single sided optic pattern. It is contemplate herein, and considered to be within the scope of the invention, that the type/pattern of optic on the sides 40, 42 of the light blade 16 is not limited to the flute and pillow shapes illustrated, but may be of any differing patterns capable of producing the pattern of emitted light desired. Similarly, more than one type of optic can be utilized on each side of the blade, e.g. a combination of flute and pillow features. Additionally, as a result of the solid state illuminators 20 and single light blade 16, the side walls 48 (FIGS. 1 and 2C) of the assembly 10 may be minimized in height, thereby reducing the overall side profile of the assembly, as discussed above.

The foregoing invention has been described in accordance with the relevant legal standards, thus the description is exemplary rather than limiting in nature. Variations and modifications to the disclosed embodiment may become apparent to those skilled in the art and do come within the scope of the invention. It is, therefore, to be understood that within the scope of the appended claims, the invention may be practiced otherwise than as specifically described.

What is claimed is:

1. A lighting assembly for a vehicle, comprising:
   a housing having an opening;
   a lens attached to said housing within said opening and with said housing surrounding a perimeter of said lens;
   a printed circuit board that includes a base portion and a pair of side portions that are spaced from one another on opposite sides of said base portion and extend generally transversely to said base portion and wherein each of said side portions is at least partially disposed between said housing and said lens;
   at least one light source mounted on each of said side portions of said printed circuit board;
   a light blade having opposite sides disposed between said printed circuit board and said lens, one of said sides having a first configuration of optics and the other of said sides having a second configuration of optics, said first and second configurations of optics being different;
   at least one actuator disposed on said printed circuit board for activating and deactivating said at least one light source; and
   wherein one of said first and second configurations of optics includes a plurality of discrete dimples spaced from one another and arranged such that a plurality of said discrete dimples have varying orientations and sizes from a central portion of said light blade to opposite end portions of said light blade.

2. The lighting assembly of claim 1 where said light assembly has a thickness extending between an outer surface of said housing and an outer surface of said lens, said thickness being no greater than 8 mm.

3. The lighting assembly of claim 1 wherein said plurality of light sources consist of solid state illuminators selected from the at least one of the following: LEDs, OLEDs and EL driven devices.

4. The lighting assembly of claim 1 wherein said first configuration of optics include elongate flutes extending substantially parallel to one another.

5. The lighting assembly of claim 1 wherein said second configuration of optics includes discrete dimples.

6. The method of claim 1 wherein the at least one actuator is a button.

7. A method of constructing a lighting assembly for a vehicle, comprising:
   providing a housing which has an opening;
   attaching a lens to the housing within the opening and with the housing surrounding a perimeter of the lens;
   providing a printed circuit board that includes a base portion and a pair of side portions that are spaced from one another on opposite sides of the base portion and extend generally transversely to the base portion and wherein each of the side portions is at least partially disposed between the housing and the lens;
   mounting at least one light source on each of the side portions of the printed circuit board;

mounting at least one actuator on the printed circuit board for activating and deactivating the at least one light source;

forming a light blade having opposite sides and providing one of the sides with a first configuration of optics and providing the other of the sides with a second configuration of optics different from the first configuration of optics, one of the first and second configurations of optics including a plurality of discrete dimples spaced from one another and arranged such that a plurality of the dimples have varying orientations and sizes from a central portion of the light blade to opposite end portions of the light blade; and disposing the light blade between the lens and the printed circuit board and operably attaching the housing to the printed circuit board.

8. The method of claim 7 further including forming the light assembly having a thickness extending between an outer surface of the lens and a bottom surface of the assembly with the thickness being no greater than 8 mm.

9. The method of claim 7 further including forming the first configuration of optics as elongate flutes extending substantially parallel to one another and forming the second configuration of optics as the discrete dimples.

10. The method of claim 7 further including forming one of the first or second configuration of optics having a uniform pattern and forming the other of the first or second configuration of optics having a non-uniform pattern.

11. The method of claim 7 wherein the at least one actuator is a button.

* * * * *